United States Patent [19]
Meier

[11] Patent Number: 5,872,664
[45] Date of Patent: Feb. 16, 1999

[54] DISTORTION OF AN ISOLATED PULSE

[75] Inventor: Stephen F. Meier, Union City, Calif.

[73] Assignee: Phase Metrics, Inc., San Diego, Calif.

[21] Appl. No.: 761,502

[22] Filed: Dec. 6, 1996

[51] Int. Cl.$^6$ ................................................ G11B 27/36
[52] U.S. Cl. .............................................................. 360/31
[58] Field of Search ............................... 360/31, 46, 48, 360/51, 39, 53, 54; 369/59

[56] References Cited

U.S. PATENT DOCUMENTS

| | | | |
|---|---|---|---|
| 5,060,088 | 10/1991 | Dolivo et al. .............................. | 360/46 |
| 5,526,200 | 6/1996 | Yada ......................................... | 360/51 |
| 5,550,683 | 8/1996 | Koren ........................................ | 360/46 |
| 5,677,802 | 10/1997 | Saiki et al. ............................. | 360/31 X |

OTHER PUBLICATIONS

Alexander Taratorin, PRML: A Practical Approach, Guzik Technical Enterprises.

*Primary Examiner*—Muhammad N. Edun
*Attorney, Agent, or Firm*—Blakely Sokoloff Taylor & Zafman

[57] ABSTRACT

A method of determining the distortion of an isolated pulse. Write data signals are recorded onto a magnetic storage media. Each write data signal includes a single transition that is relatively unaffected by adjacent transitions. Read-back signals, each of which corresponds to a write data signal, are read from the magnetic storage media. The shape of the write data signals are measured. The difference between the shape of each write data signal and the shape of an ideal isolated pulse is measured.

24 Claims, 12 Drawing Sheets

| Taa = | 1.0 | | |
|---|---|---|---|
| Sample# | Threshold% | T1 | T2 |
| 1 | 20 | 52 | 53 |
| 2 | 25 | 50 | 50 |
| 3 | 30 | 48 | 48 |
| 4 | 35 | 45 | 46 |
| 5 | 40 | 43 | 43 |
| 6 | 45 | 41 | 41 |
| 7 | 50 | 38 | 39 |
| 8 | 55 | 36 | 36 |
| 9 | 60 | 33 | 34 |
| 10 | 65 | 31 | 32 |
| 11 | 70 | 28 | 29 |
| 12 | 75 | 26 | 26 |
| 13 | 80 | 23 | 23 |
| 14 | 85 | 20 | 20 |
| 15 | 90 | 16 | 16 |

Fig. 12

| Sample# | Time | Amplitude Value |
|---|---|---|
| 1 | 0 | -3.9E-17 |
| 2 | 12 | -0.09757 |
| 3 | 24 | -0.18097 |
| 4 | 36 | -0.21718 |
| 5 | 48 | -0.18006 |
| 6 | 60 | -0.05845 |
| 7 | 72 | 0.139214 |
| 8 | 84 | 0.384967 |
| 9 | 96 | 0.63662 |
| 10 | 108 | 0.846928 |
| 11 | 120 | 0.974495 |
| 12 | 132 | 0.993587 |
| 13 | 144 | 0.900316 |
| 14 | 156 | 0.713585 |
| 15 | 168 | 0.470528 |
| 16 | 180 | 0.217654 |
| 17 | 192 | 3.9E-17 |
| 18 | 204 | -0.14892 |
| 19 | 216 | -0.21388 |
| 20 | 228 | -0.1998 |
| 21 | 240 | -0.12862 |
| 22 | 252 | -0.03205 |

Fig. 7

DISTORTION OF AN ISOLATED PULSE

FIELD OF THE INVENTION

The present invention relates generally to the field testing magnetic recording media. More specifically, the present invention relates to measuring the distortion of signals recorded on a magnetic media.

BACKGROUND OF THE INVENTION

Most present disk drives are based on magnetic recording technology. Magnetic recording technology may be described by two distinct processes: writing onto the magnetic storage media and reading from the magnetic storage media. The whole phenomena of writing on the surface of a magnetic storage media consists of changing the magnetic polarity from north to south or from south to north.

FIG. 1a illustrates a change in the orientation of the magnetic field 110. While writing on the magnetic surface, the magnetic storage media which is typically a disk, continues to rotate under the recording head. The change in magnetic polarity (also referred to as change in magnetization) creates a transition in the write data signal which is used to record data onto the magnetic storage media. Because it is impossible to instantaneously build up a current, the transition in the write data signal has a finite rise time. FIG. 1 illustrates the transition of the write data signal 120 as the magnetic field 110 changes magnetization.

In order to read back data from the magnetic storage media, the transitions are detected by the read head. The read head may be the same head as the recording head and is therefore referred to as the R/W head. The readback signal is typically a voltage signal representing the non-linear response of the write data signal. The readback 130 illustrates the readback signal for the transition in the write data signal 120 shown in FIG. 1a.

FIG. 1b illustrates a write data signal 140 having multiple transitions. The readback signal 160 illustrates the non-linear transform of the write data signal 140. According to FIG. 1b, the magnetic recording media and the R/W head creates the non-linear system 150.

All magnetic recorders produce unwanted signals in the form of noise, which impose limitations on the achievable performance of the magnetic recorder. Two of the major sources of noise is the medium noise and the head noise. The medium noise arises from the fact that no medium is magnetically homogeneous. In other words, the recording medium noise is due to the uncertainty or randomness of some property of the medium and any variation from point to point will produce medium noise. The major head noise arises from the fact that any head possess an impedance, and the real part of this impedance gives rise to noise of thermal origin. Other forms of head noise are associated with magnetic domain changes or magnetostriction effects such as the Barkhausen noise.

Noise renders the output signal an imperfect replica of the non-linear transform of the input signal. In other words, the noise causes the readback signals to deviate from an ideal readback signal. Therefore, one of the tasks of the recording system designer is reduce the noise to a tolerable level so that some predetermined criteria of performance are met. A common criteria for performance is the signal-to-noise ratio ("SNR").

Currently, several techniques are available for measuring the distortion of the readback signal caused by noise. The distortion in the readback signal is typically caused by multiple factors. Among these factors are: amplitude loss due to linear superposition of crowded transitions, pattern induced bit-shift, isolated pulse distortion, over-write of a previously written signal, partial erasure of data, and other forms of noise.

Dipulse Extraction using Pseudo-random Sequences proposed by IBM in 1987 is a well know method of measuring different nonlinear distortions in the readback signal. Alexander Taratorin, *PRML: A Practical Approach*, Guzik Technical Enterprises. The Dipulse Extraction is based on the "shift" and "add" properties of a pseudo-random sequence. A Pseudo-Random Sequence is generated by a polynomial (e.g., $x^7+X^3+1$) which possess "shift" and "add" properties. The shift and add properties means that the exclusive OR (a product of two NRZ bits) of the initial sequence is the same sequence shifted by some number of bits. If the pseudo-random sequence is written on the disk, different non-linear distortions create specific terms in the readback signal. More specifically, the readback signal is described by the main or "zero" term and one or several "copies" or "echoes" caused by non-linearities. The shift and add properties allow one to predict where the echoes will be found.

The method of dipulse extraction provides a method for selecting these echoes. The advantage of the dipulse extraction method is that it provides a separation of different non-linear effects into different echoes of pseudo-random sequence and some approximate estimates of these non-linearities. The amount of distortion can be determined by the size of the echo. The dipulse extraction method of testing requires the measurement of the dipulse shape or an idealized dipulse shape. However, this method is complicated and requires sophisticated hardware and software.

FIG. 1c illustrates an extracted dipulse with echoes which characterize non-linearities. The waveform 170 is the result of complex computations based on the pseudo-random sequence. According to FIG. 1c, there is a main pulse referred to as the main term 180 and four smaller pulses referred to as echoes 190a, 190b, 190c, and 190d. The echoes may correspond to various non-linearities such as an over-write of a previously written signal, a hard/easy transition shift or a nonlinear transistion shift.

Under certain circumstances, it may be useful to measure the distortion on an isolated pulse without measuring the other distortion variables. Therefore, it is desirable to provide a simple and accurate method of measuring the distortion of an isolated pulse without using the complex method of dipulse extraction. Furthermore, it is desirable to measure distortion of an isolated pulse without the interference between two adjacent pulses forming a dipulse.

SUMMARY OF THE INVENTION

The present invention provides a method for measuring the distortion of an isolated pulse. At least two write data signals are recorded onto a single track of a magnetic storage media. Each of the write data signals includes a single transition that is relatively unaffected by adjacent transitions. At least two readback signals from the single track of the magnetic storage media is read. Each of the readback signals corresponds to one of the write data signals recorded.

The shape of at least two of the readback signals is measured using a digital storage oscilloscope, a time interval analyzer, or some other type of test equipment. The difference between the shape of each readback signal and the shape of an ideal isolated pulse for each readback signal is determined. The difference between the shape of each readback signal and an ideal isolated pulse represents the distortion of an isolated pulse recorded on a single track of magnetic storage media.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 7 is an illustration of the sample values corresponding to the isolated pulse simulated in FIG. 6.

FIG. 12 is an illustration of the sample values corresponding to the isolated pulse simulated in FIG. 11.

DETAILED DESCRIPTION

In the following detailed description of the present embodiment numerous specific details are set forth in order to provide a thorough understanding of the present embodiment. However, it will be obvious to one skilled in the art that the present invention may be practiced without these specific details. In other instances, well known methods, procedures, components, and circuits have not been described in detail as not to unnecessarily obscure aspects of the present invention.

The shape of an isolated pulse is one of the primary contributions limiting the recording density in digital magnetic storage systems. Therefore, by measuring the distortion of an isolated readback signal, also referred to as an isolated pulse, the performance of the magnetic storage media may be improved. The present embodiment measures the distortion of an isolated pulse by measuring the shape of an isolated pulse and then comparing the shape of the measured pulse with the shape of a pulse that would be ideal for a selected read back channel.

Figure 1A:
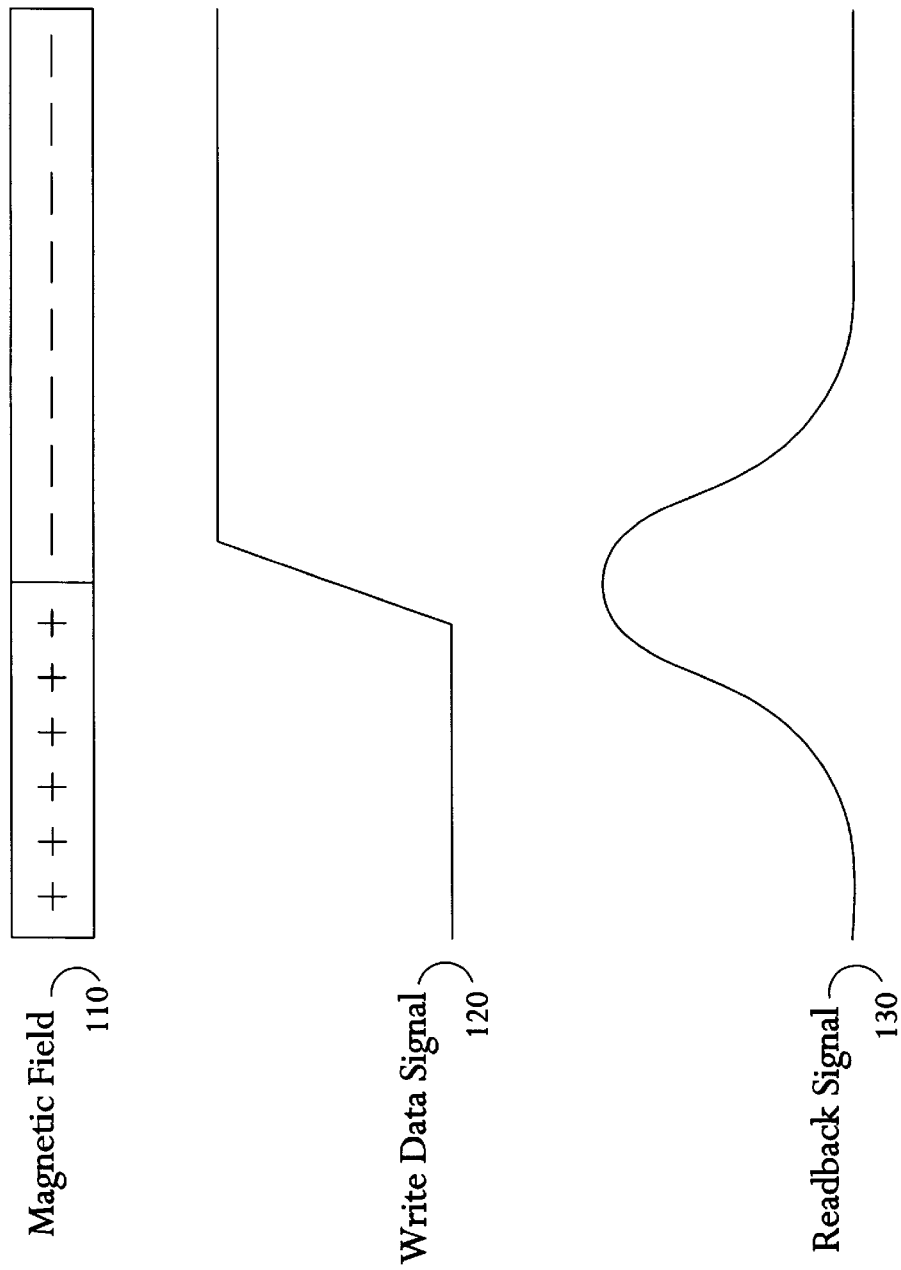
FIG. 1a is an illustration of a typical isolated pulse.
Figure 1B:
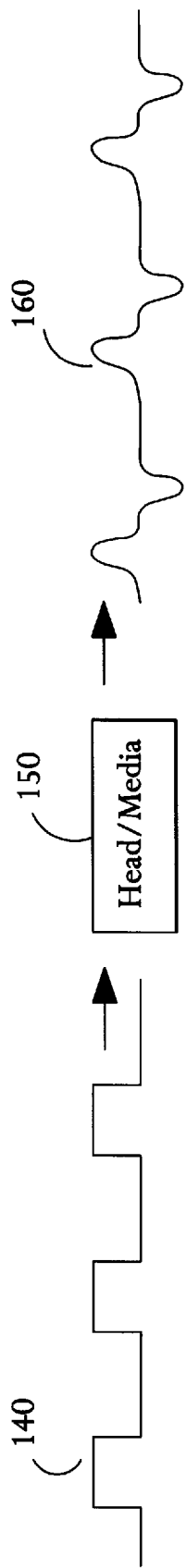
FIG. 1b illustrates the typical response of a write data signal having multiple transitions.
Figure 1C:
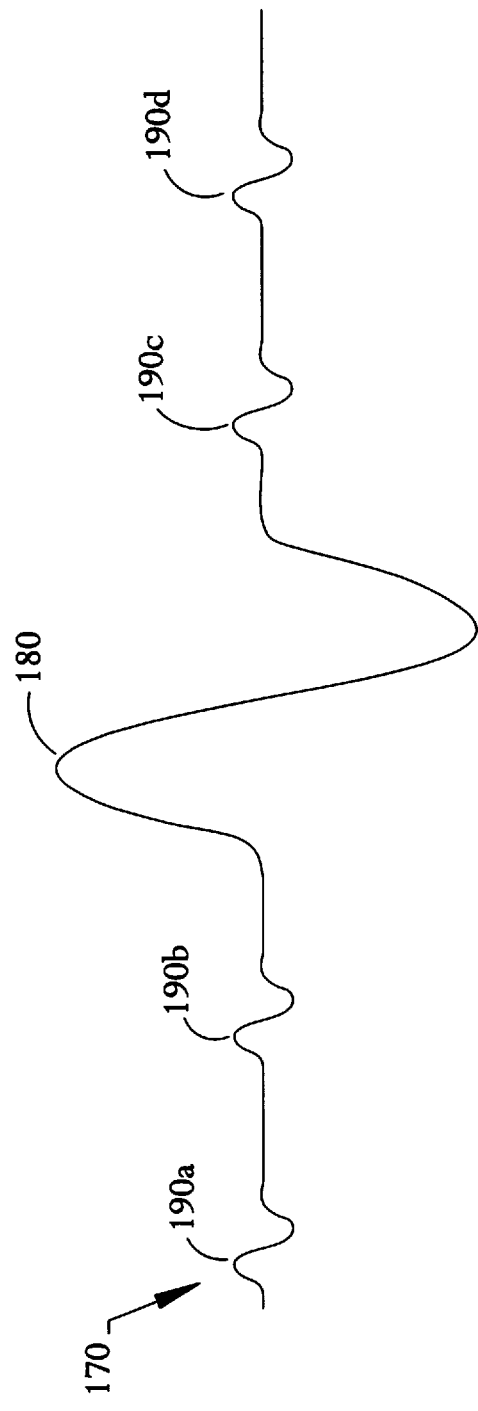
FIG. 1c is an illustration of a typical dipulse.
Figure 2A:
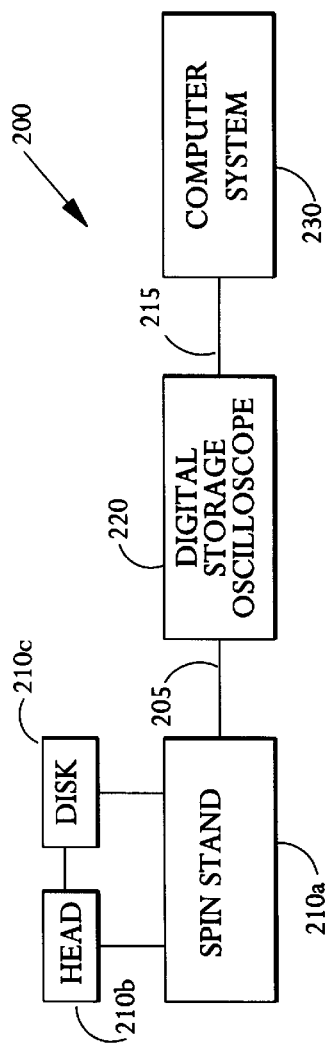
FIG. 2a illustrates one embodiment of a test system for measuring the distortion of an isolated pulse.
Figure 2B:
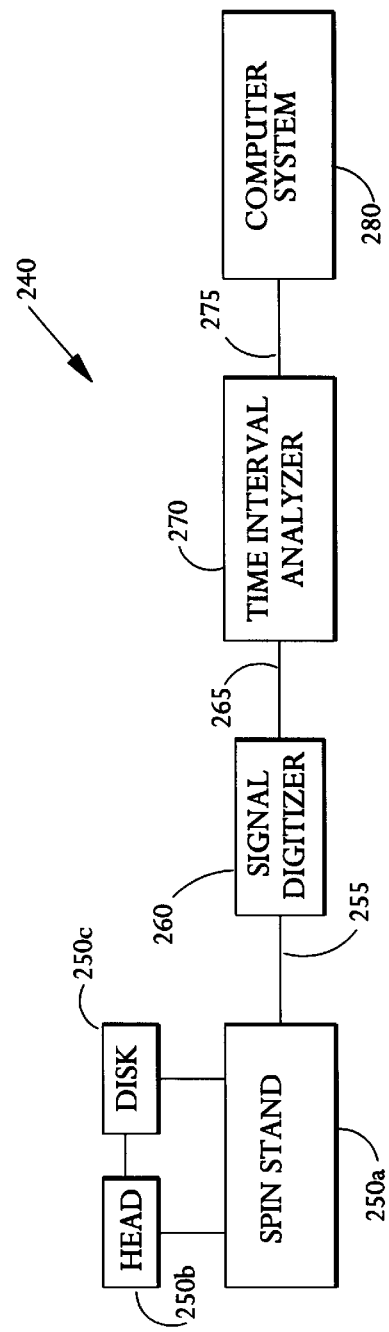
FIG. 2b illustrates another embodiment of a test system for measuring the distortion of an isolated pulse.

FIGS. 2a and 2b illustrate testing systems or set-ups that may be used to measure the distortion of an isolated pulse and to compare the shape of the measured pulse with that of an ideal pulse. When using the test system 200 shown in FIG. 2a, isolated pulses are recorded onto the disk 210c. For an alternate embodiment, the isolated pulses may be recorded on another type of magnetic recording media. The spin stand 250a includes the write and read electronics and is used to control the reading and writing of data onto the disk 210c via the head 210b. The spinstand 210a, the disk 210c, and the head 210b may be referred to as a disk drive.

According to FIG. 2a, a digital storage oscilloscope 220 is used to measure the shape of the isolated pulses and a computer system 230 is used to compare the shape of the measured pulses with the ideal pulse. The digital storage oscilloscope 220 receives analog readback signals from the disk 210c over line 205. The analog readback signals represent the readback signal of the isolated pulses that have been recorded on the disk 210c. After measuring the shapes of the isolated pulses, the measured data is transferred to the computer system 230 over line 215. The computer system 230 determines the amount of distortion of the isolated pulses by comparing each measured isolated pulse with an ideal isolated pulse.

The test system 240 shown in FIG. 2b uses a time interval analyzer 270, rather than a digital storage oscilloscope, to measure the shape of the isolated pulses recorded on the disk 250c. For alternative embodiments, measuring devices similar to a time interval analyzer or a digital storage oscilloscope may be used. When using the test system 240, isolated pulses are recorded onto the disk 250c. The spin stand 250a includes the write and read electronics and is used to control the reading and writing of data onto the disk 250c via the head 250b.

According to FIG. 2b, the analog readback signal representing the data read back from the disk is received by a signal digitizer 260. The signal digitizer 260 converts the analog readback signal into a digital signal that can be used by the time interval analyzer 270. The time interval analyzer 270 receives the digitized signals over line 265 and measures the shape of the isolated pulses recorded on the disk 210c. The measured data is then transferred to the computer system 280 over line 275. The computer system 230 and 280 may include any data processing system capable of comparing the shape of each measured isolated pulse with the shape of an ideal pulse.

Figure 3:
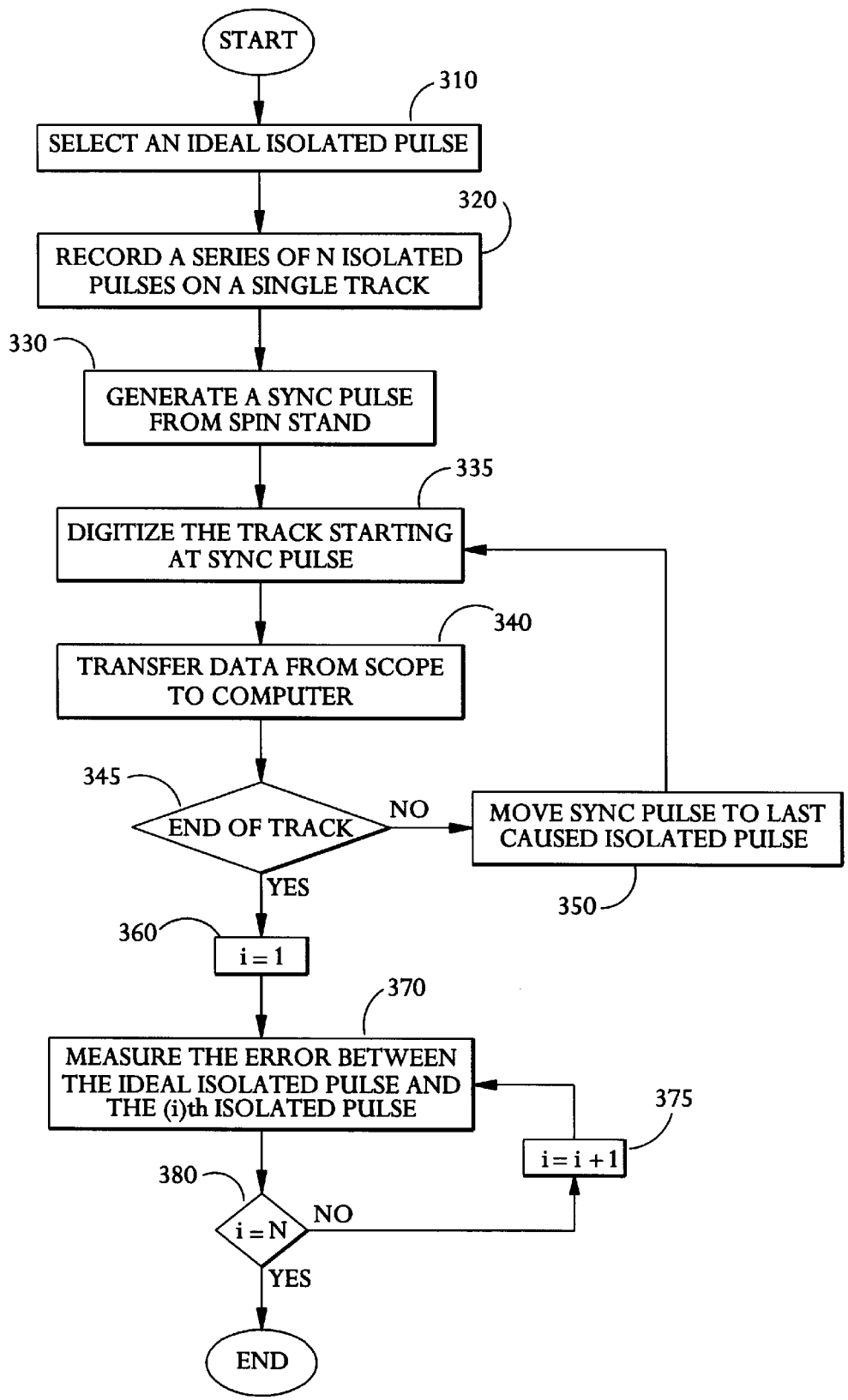
FIG. 3 is a flow chart illustrating a method of measuring the distortion of an isolated pulse using a digital storage oscilloscope or a similar type of equipment.

FIG. 3 illustrates one method for measuring the distortion on isolated pulses. The first step 310 is to select an ideal isolated pulse. For example, the ideal pulse may be a Lorentzian pulse or a sinc pulse. The Lorentzian pulse may be defined by the equation $p(t)=1/[1+(2t/PW50)^2]$ and the sinc pulse may be defined by the equation $$p(t) = \frac{\sin(t/pw50)}{t/pw50} .$$

The ideal pulse represents the ideal pulse for a read back channel selected to be tested.

Once the ideal isolated pulse is selected, the next step 320 is to record a series of isolated pulses on a single track of the magnetic storage media. The isolated pulses may be recorded by simply providing a series of write data signals having a single transistion which is not affected by adjacent transitions. It is imperative that the individual write data signals are spaced far enough apart such that adjacent write data signals have a minimal effect on each other. In other words, an isolated pulse is a write data signal in which the adjacent write data signals do not change the amplitude or a shift the peak of the write data signal.

Typically, the distortion of isolated pulses are measured on a track by track basis because the various tracks in a recording media may have varying parameters (i.e., bit density). A minimum of two isolated pulses is typically required to be written onto a single track. The number of isolated pulses N which are written onto a single track may vary. For one embodiment, approximately 1000 to 10,000 isolated pulses are written onto a single track. Note that if the media is uniform across the surface of the disk then sampling just a few tracks will suffice to test the entire recording media.

After recording the series of isolated pulses, the next step is to generate a synchronization pulse from a spin stand, as shown in step 330. The synchronization pulse is used to trigger the digital storage oscilloscope. The digital storage oscilloscope is used to sample each isolated pulses recorded.

Once the digital storage oscilloscope is triggered, the digital storage oscilloscope digitizes the track starting at the synchronization pulse. It is important to note at a given sample rate (i.e., samples per second), the digital scope measures and records the amplitude of the readback signal. Thus, during the digitizing step 335, the digital storage oscilloscope measures (i.e., samples) the amplitude of a single isolated pulse at various intervals. The intervals are determined by the given sample rate.

After the single isolated pulse has been digitized, the sampling data (i.e., the amplitude of the single isolated pulse at various sample times) is transferred from the digital storage oscilloscope to a data processor which may be a computer. Step 340 shows that the sampling data is transferred to a computer for one embodiment.

Next, in step 345, a determination is made whether the entire track has been digitized. In other words, have all the isolated pulses in the series of N isolated pulses recorded on the track been sampled? If the answer is "no", the spin stand moves the location of the synchronization pulse to the last measured isolated pulse, as shown in step 350. Then, steps 335, 340, 345, and 350 are repeated. On the other hand, if all N isolated pulses have been sampled, (i.e., the answer in step 345 is "yes"), then the next step is step 360.

The error between the ideal isolated pulse and each of the N isolated pulses is measured in steps 360, 370, 380, and 375. The index i is used to count the number of isolated pulses which have been compared to the ideal isolated pulse. The error between the ideal isolated pulse and the measured isolated pulse represents the distortion of the measured isolated pulse. For one embodiment, the distortion may be computed by using the least squares error method.

Figure 4:
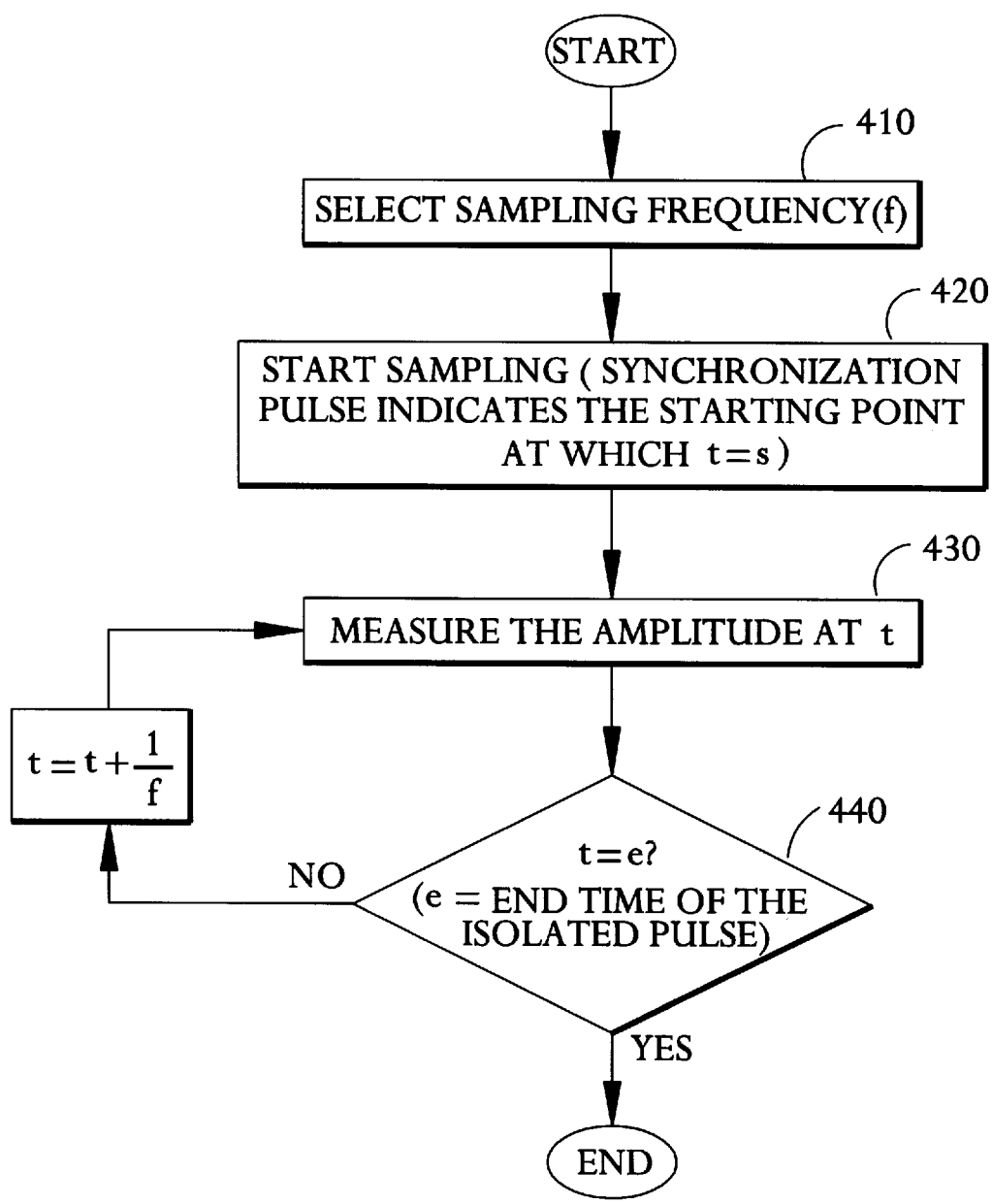
FIG. 4 is a flow chart illustrating a method of sampling an isolated pulse when using a digital storage oscilloscope or a similar type of equipment.

FIG. 4 illustrates the various steps involved in the digitizing step 335.

Before an isolated pulse may be digitized, the sampling frequency f must be selected as shown in step 410. For one embodiment the sampling frequency is selected to be at least three times higher than the twice the highest frequency that would be used to write data onto the track during the normal recording of data. The sampling frequency is used to determine the sample time for each sample.

According to step 420, the synchronization signal indicates the starting point for the sampling. At the starting point, the sample time t=s. In step 430, the amplitude of the isolated pulse is measured at the sample time t. The amplitude of the isolated pulse is measured at the various time intervals in accordance with steps 430, 440, and 435 until the entire isolated pulse is sampled.

Figure 6:
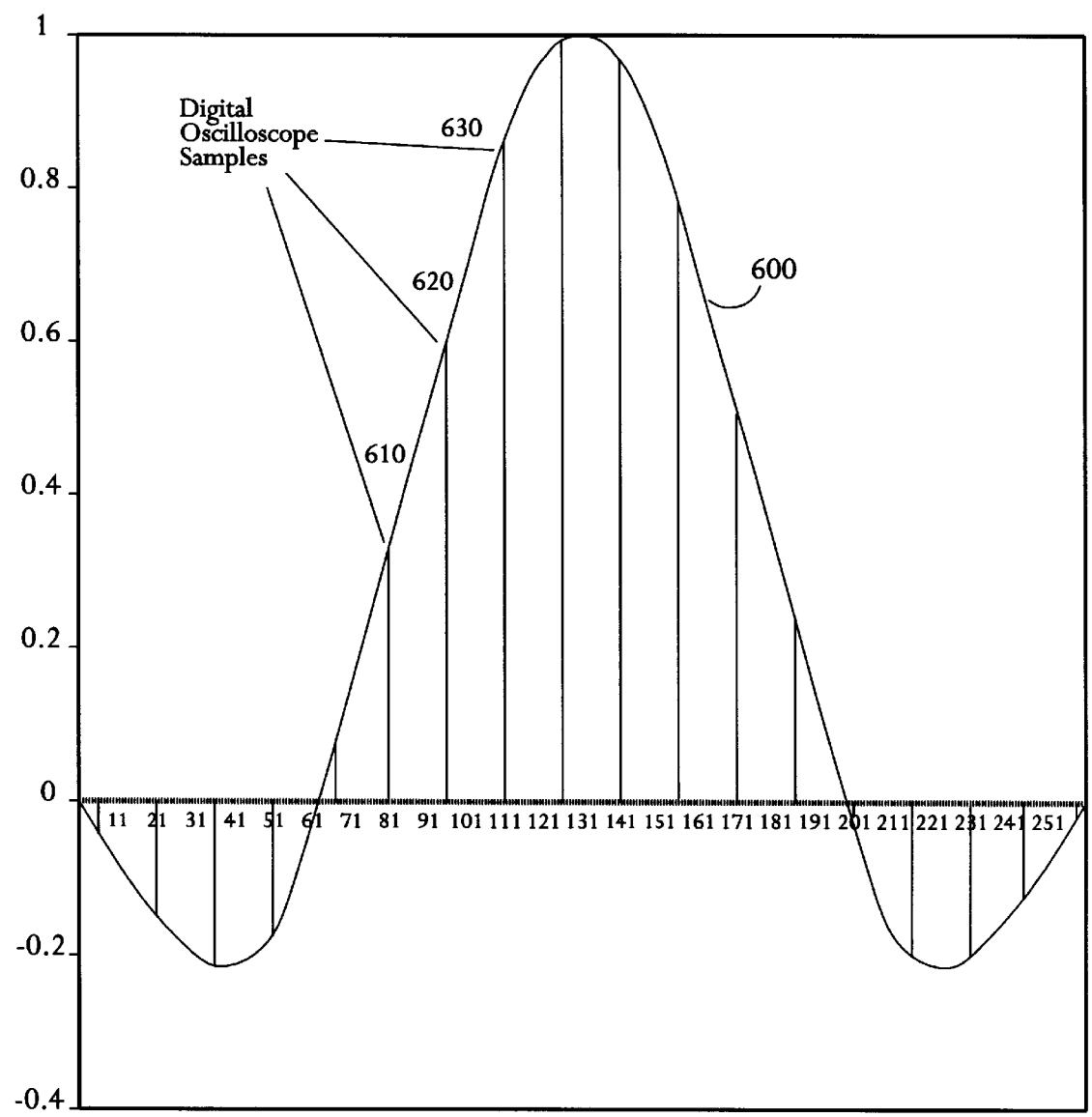
FIG. 6 is an illustration of an isolated pulse simulated when using digital storage oscilloscope or a similar type of equipment.

FIG. 6 illustrates an isolated pulse 600 sampled by a digital storage oscilloscope or a similar type of equipment. The isolated pulse 600 represents a sinc pulse. The horizontal lines 610, 620, and 630 represent three of the samples measured by the digital storage oscilloscope. FIG. 7 illustrates the simulated sample values for the isolated pulse 600 measured by the digital storage oscilloscope. Note that samples numbered 1 and 22 are not shown in FIG. 6, and that the horizontal lines 610, 620, and 630 respectively correspond to the samples numbered 8, 9, and 10.

Figure 5:
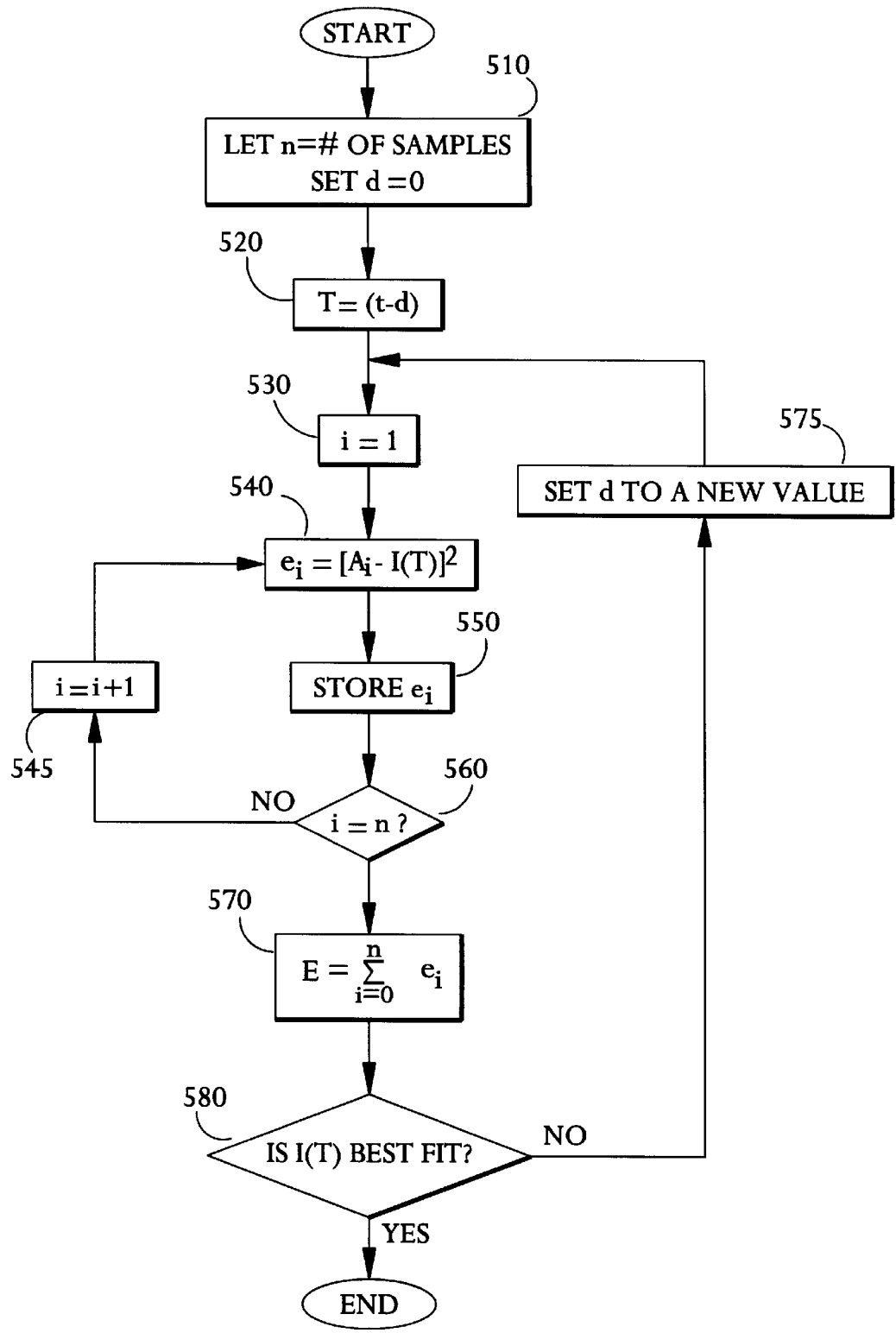
FIG. 5 is a flow chart illustrating a method of determining the error between the measured isolated pulse and an ideal isolated pulse when using a digital storage oscilloscope or a similar type of equipment.

FIG. 5 describes step 370 which includes the step of measuring the error between the ideal isolated pulse and each of the measured isolated pulses. According to FIG. 5, the variable n equals the number of samples measured by the digital storage oscilloscope and the variable d is set to "0" in step 510. The variable d represents the time variable of the ideal isolated pulse and is used to determine the best fit between a measured isolated pulse and an ideal isolated pulse. Step 520 defines the variable T as T=(t−d).

The index i is used to count the number of samples for each measured isolated pulse. In step 540, the error es for one of the samples is computed. In step 550, the error value $e_i$ for one of the samples is stored. Therefore, the error value $E_i$ is computed for each sample measured by the digital storage oscilloscope. For example, in FIG. 7, twenty-two samples were taken and therefore twenty-two error values $e_i$ need to be computed for the isolated pulse 600. The error value $e_i$ is actually computed by the equation $e_i=[A_i-I(T)]^2$ shown in step 540, where $A_i$ represents the amplitude value for a given sample and I(T) represents the amplitude value for the ideal isolated pulse at a given time T. Once the error value es for each sample is computed as shown in steps 530, 540, 550, 560, and 545, the total Error E for the measured isolated pulse is calculated. According to step 570, the total Error $$E = \sum_{i=0}^{E} e_i.$$

Because the amplitude of the ideal isolated pulse I(T) is dependent on the time T, the best fit between the ideal isolated pulse and the measured isolated pulse may be determined by using the least squares error method. The best fit occurs at the time T when the total Error E is calculated to have its minimum value for a particular measured isolated pulse. Therefore, step 580 checks whether the total Error E provides the best fit. The best fit may be computed by any of the currently available methods.

If the time T does not provide the best fit, then a new time T is used in calculating the error $e_i$ by setting the variable d to a new value as shown in step 575. Once the best fit is made between the ideal isolated pulse and the measured isolated pulse, the total Error E represents the distortion of one of the measured isolated pulse. According to FIG. 3, the distortion for each measured isolated pulse for a particular track is calculated. These values may be used to analyze the uniformity and average shape distortion of the isolated pulses around the track.

The distortion of isolated pulses caused by particular magnetic recording media provides useful information to the disk or disk drive manufacturer. For example, if a particular disk causes too much distortion on isolated pulses, then the particular disk may fail the outgoing parametric tests performed by the manufacturer. Furthermore, this distortion test may provide the manufacturer with enough information to identify the steps in the manufacturing process that may need to be improved in order to increase the yield of functional disks. Also, this particular type of test may allow a disk drive manufacturer to identify the isolated pulse distortion and to offset the distortion by adjusting the equalizer. In other words, once the distortion for isolated pulses is completed for a particular magnetic recording media, a variety of steps may be taken to improve the performance of that particular magnetic recording media.

Figure 8:
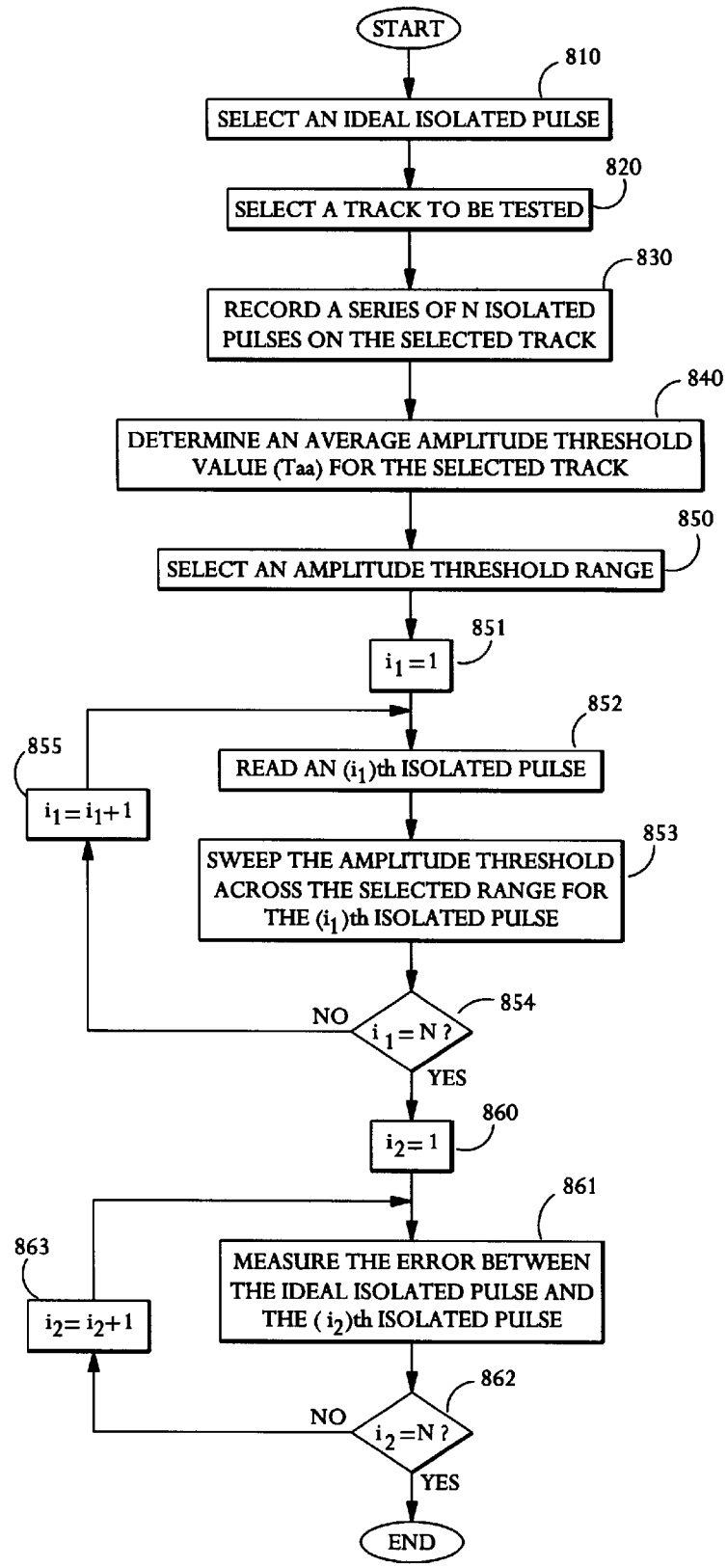
FIG. 8 is a flow chart illustrating a method of measuring the distortion of an isolated pulse when using a time interval analyzer or a similar type of equipment.

FIG. 8 illustrates an alternative method of measuring the distortion of isolated pulses recorded on a magnetic storage media. In step 810, an ideal isolated pulse is selected. This is similar to step 310 in FIG. 3. Next, a particular track is selected to be tested in step 820. Typically, the distortion of isolated pulses are measured on a track by track basis because the various tracks in a recording media may have varying parameters (i.e., bit density).

In step 830, a series of isolated pulses are recorded onto the selected track. The number of isolated pulses N which are written onto a single track may vary. For one embodiment, approximately 1000 to 10,000 isolated pulses are written onto a single track.

The method in FIG. 8 uses a time interval analyzer to measure the time at selected amplitudes. According to step 840, the track average amplitude value Taa for the selected track must be determined. Typically, the Taa value may be determined by a number of well known methods. Once the track average amplitude value Taa is selected, the next step is to select the range of amplitude threshold percentages. Each threshold percentage represents a percentage of the track average amplitude value Taa.

Steps 851, 852, 853, 854, and 855 involve the steps of reading each isolated pulse recorded and then sweeping the amplitude threshold across the selected range for each isolated pulse recorded. The values T1 and T2 are measured for each sample or sweep performed by the time interval analyzer. The value T1 represents the distance measured between the peak tp of an isolated pulse and a first threshold crossing at a specified threshold percentage. The value T2 represents the distance measured between the peak tp of the isolated pulse and a second threshold crossing at the specified threshold percentage. The index $i_1$ counts the number of isolated pulses. If the index $i_1$ does not equal N in step 854, then the next index $i_1$ is incremented by 1, and steps 852, 853, and 854 are repeated.

Once the values T1 and T2 are measured for each isolated pulse recorded, the next step 861 is to measure the error between the ideal isolated pulse and each isolated pulse. The index $i_2$ counts the number of isolated pulses recorded and measured in steps 860, 862, 863. If the index $i_2$ does not equal N in step 862, then the index $i_2$ is incremented by 1, and steps 861 and 862 are repeated. For one embodiment, the error may be computed by using the least squares error method.

Figure 9:
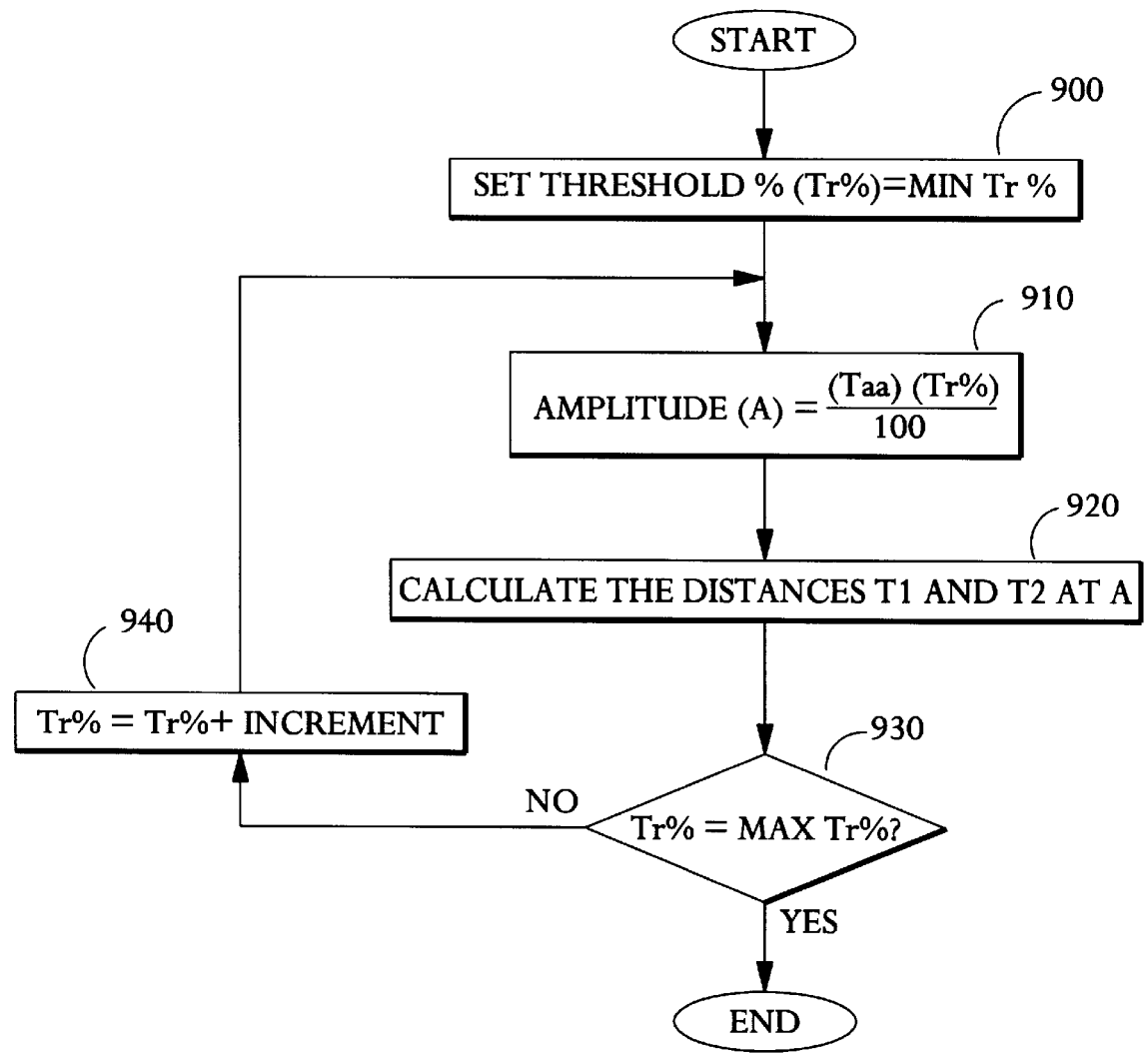
FIG. 9 is a flow chart of a method of sweeping the amplitude threshold across the selected amplitude threshold percentage range when using a time interval analyzer or a similar type of equipment.

FIG. 9 illustrates the various steps involved in the sweeping step 853.

The first step 900 is to set the threshold percentage Tr % to the minimum threshold percentage min Tr % in the selected range. The next step 910 is to calculate the amplitude A of the isolated pulse at the current threshold percentage Tr %. According to step 910, the amplitude A=[(Taa)(Tr %)]/100. Next, the distance T1 and T2 is calculated at A in step 920 by the time interval analyzer.

The threshold percentage Tr % is checked to determine whether the maximum threshold percentage max Tr % has been sampled in step 930. If the maximum threshold percentage max Tr % has not been sampled, then the threshold percentage Tr % is incremented by a selected increment and steps 910, 920, and 930 are then repeated. Once the maximum threshold percentage max % has been sampled, then the sweeping process has been completed.

Figure 11:
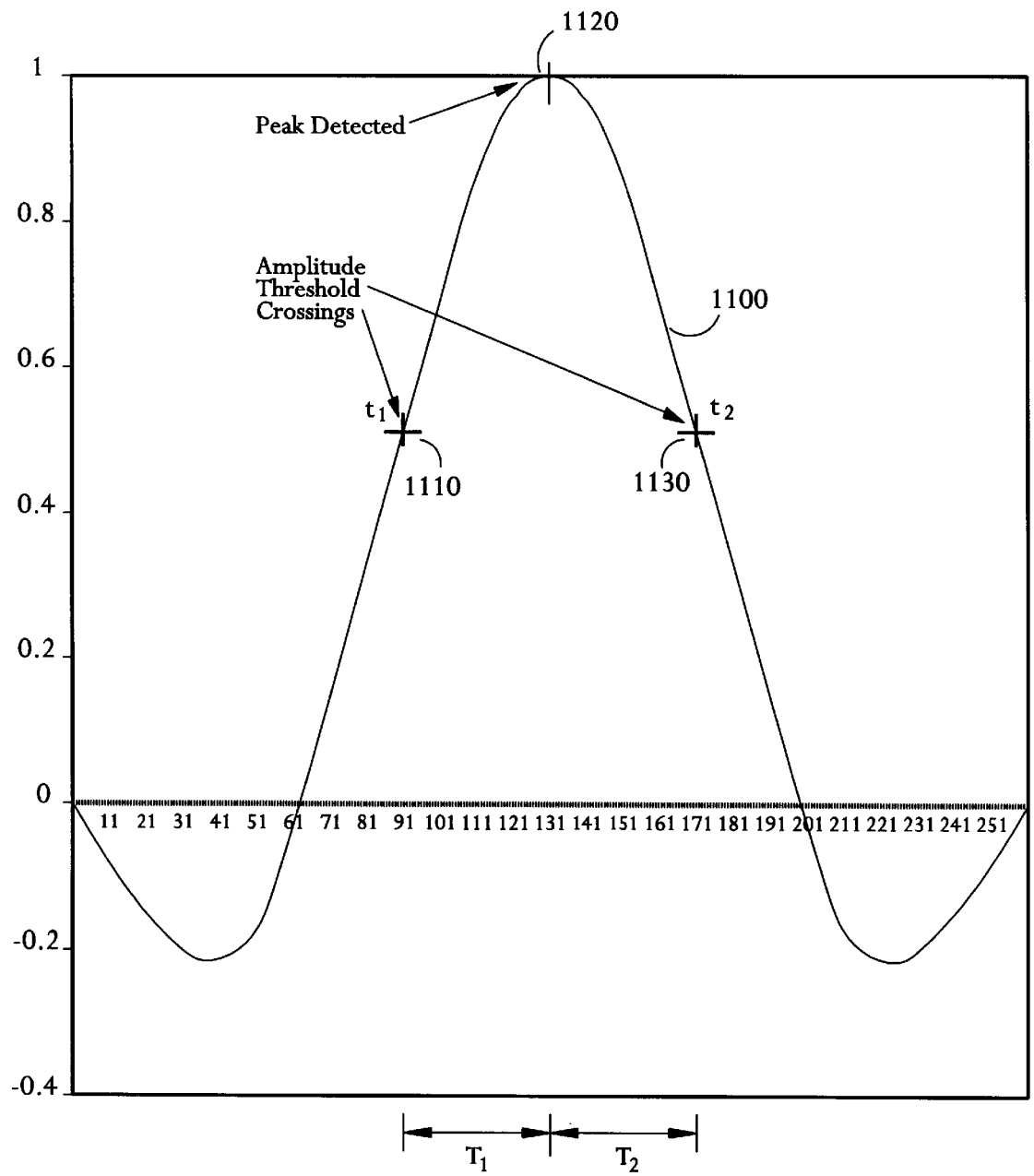
FIG. 11 is an illustration of an isolated pulse simulated with a time interval analyzer or a similar type of equipment.

FIG. 11 illustrates an isolated pulse 1100 displayed by a time interval analyzer or a similar type of equipment. The isolated pulse 1100 represents a sinc pulse. The point 1110 and 1130 indicate the amplitude threshold crossings $t_1$ and $t_2$ at an amplitude threshold percentage of about 50%. The peak tp of the isolated pulse 1100 is detected at point 1120. Note that T1 and T2 are shown at the bottom of FIG. 11. T1 represents the distance measured between the peak tp of the isolated pulse 1100 and the first threshold crossing at $t_1$. T2 represents the distance measured between the peak tp of the isolated pulse 1100 and the second threshold crossing at $t_2$.

FIG. 12 illustrates the data simulated by the time interval analyzer for the isolated pulse 1100. According to FIG. 12, the track average time Taa is 1.0 and the selected threshold percentage Tr % range is between 20% and 90% at a selected increment of 5%. The distance T1 and T2 are calculated for the 15 samples or sweeps. Note that FIG. 11 illustrates the values for the fifth sample in the table shown in FIG. 12.

Figure 10:
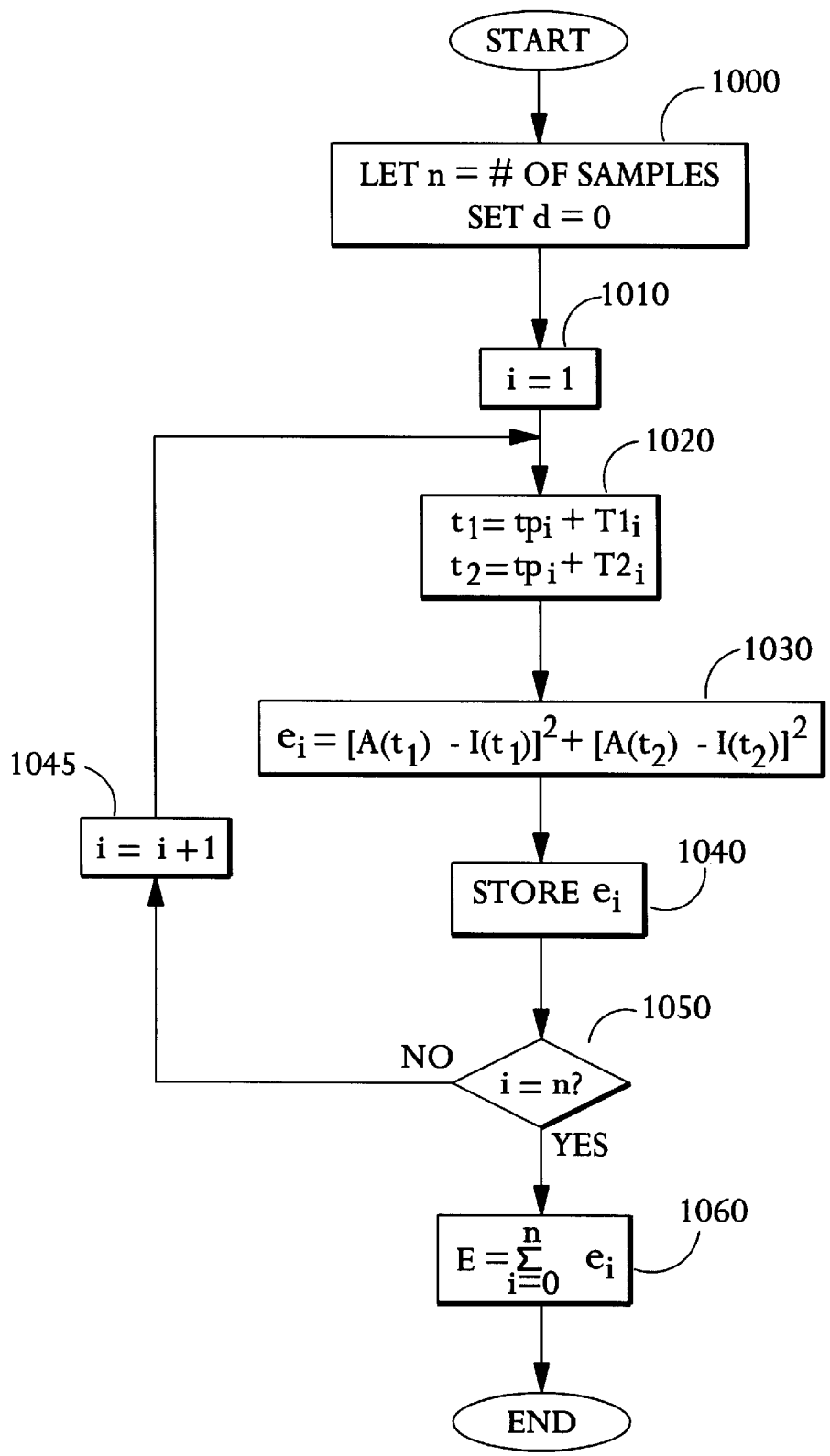
FIG. 10 is a flow chart illustrating a method of determining the error between the measured isolated pulse and an ideal isolated pulse when using a time interval analyzer or a similar type of equipment.

FIG. 10 illustrates the steps involved in measuring the error in step 861. In step 1000, the variable n is equal to the number of samples or sweeps.

The index i counts the number of samples or sweeps made in the selected threshold percentage Tr % range. In step 1010 the index i is set to 1. Next, the first amplitude threshold crossing t, and the second amplitude threshold crossing $t_2$ are determined. According to step 1020, $t_1=tp_i-T1_i$ and $t_2=tp_i+T2_i$. The error between the ideal isolated pulse and the measured isolated pulse for a particular sample is calculated in step 1030. This error value $e_i$ is stored in step 1040. Step 1050 checks whether the error has been calculated for all the samples. If the error value has not been calculated for all the samples, then steps 1020, 1030, 1040, and 1050 are repeated.

Once the error value has been calculated for all samples, the total Error E is computed by adding all the error values for all the samples of an isolated pulse. The total Error E represents the distortion of one of the measured isolated pulses. Therefore, once the total Error E has been computed for each of the isolated pulses measured, this data may be used to better understand the characteristics of the magnetic recording media.

The invention has been described above with reference to specific exemplary embodiments. It is evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for determining a distortion of an isolated pulse, comprising the steps of:

(a) recording a write data signal onto a selected track of a magnetic storage medium, the write data signal including a single transition;

(b) reading a readback signal from the selected track of said magnetic storage medium, the readback signal corresponding to the write data signal and including an isolated pulse, the isolated pulse corresponding to the single transition in the write data signal;

(c) measuring a shape of the isolated pulse;

(d) computing a distortion value for the measured isolated pulse, the distortion value representing the difference between the shape of the measured isolated pulse and a shape of an ideal isolated pulse, and corresponding to the distortion of the isolated pulse.

2. The method of claim 1, wherein step (c) is performed using a digital storage oscilloscope.

3. The method of claim 1 wherein step (c) comprises the steps of:
   (1) selecting a sampling frequency which is higher than twice a highest frequency that the write data signal would be written onto the selected track during a normal recording of data;
   (2) sampling the isolated pulse at the selected sampling frequency to obtain a plurality of samples; and
   (3) measuring an amplitude of the isolated pulse at each of the samples.

4. The method of claim 3, wherein step (d) comprises the steps of:
   (i) computing a difference between an amplitude value of the measured isolated pulse at one of the samples and a corresponding amplitude value of the ideal isolated pulse;
   (ii) squaring the difference to compute an error value at the one of the samples; and
   (iii) repeating steps (i) and (ii) for each of the samples to obtain an error value for each of the samples.

5. The method of claim 4, further comprising the step of:
   (iv) computing the sum of all error values to obtain the distortion value for the measured isolated pulse.

6. The method of claim 5, further comprising the step of:
   (v) determining a time variable value for best fitting the ideal isolated pulse with the measured isolated pulse.

7. The method of claim 3, further comprising the steps of:
   (1) determining a track average amplitude of the selected track;
   (2) selecting a plurality of threshold percentages of the track average amplitude;
   (3) computing a first time interval and a second time interval for each of the selected threshold percentages, the first time interval spanning between a first time at which a first corresponding sample amplitude is approximately equal to the selected threshold percentage and a second time at which a second corresponding sample amplitude is approximately equal to a peak value of the isolated pulse, the second time interval spanning between the second time and a third time at which a third corresponding sample amplitude is approximately equal to the selected threshold percentage.

8. The method of claim 7, further comprising the steps of:
   (i) determining for one of the selected threshold percentages a first time at which a first corresponding sample amplitude is approximately equal to the one of the selected threshold percentages;
   (ii) determining a corresponding amplitude of the ideal isolated pulse at a time corresponding to said first time;
   (iii) computing a difference between the first corresponding sample amplitude and the corresponding amplitude of the ideal isolated pulse;
   (iv) squaring the difference to compute a first error value for the one of the selected threshold percentages;
   (v) repeating steps (i) through (iv) for a different one of the selected threshold percentages until a first error value is computed for each of the selected threshold percentages.

9. The method of claim 8, further comprising the steps of:
   (vi) determining for one of the selected threshold percentages a second time at which a second corresponding sample amplitude is approximately equal to the one of the selected threshold percentages;
   (vii) determining a corresponding amplitude of the ideal isolated pulse at a time corresponding to said second time;
   (viii) computing a difference between the second corresponding sample amplitude and the corresponding amplitude of the ideal isolated pulse;
   (ix) squaring the difference to compute a second error value for the one of the selected threshold percentages;
   (x) repeating steps (vi) through (ix) for a different one of the selected threshold percentages until a second error value is computed for each of the selected threshold percentages.

10. The method of claim 9, further comprising the steps of:
    (A) adding together the first error values to compute a first total error value;
    (B) adding together the second error values to compute a second total error value; and
    (C) adding together the first total error value and the second total error value.

11. The method of claim 1 wherein step (d) comprises the step of determining a best fit between the measured isolated pulse and the ideal isolated pulse using a least squares error method.

12. The method of claim 1, wherein step (c) is performed using a time interval analyzer.

13. The method of claim 1, further comprising the step of:
    (e) selecting the ideal isolated pulse.

14. The method of claim 1, further comprising prior to step (d), the step of:
    (f) determining the shape of the ideal isolated pulse.

15. A method for determining the distortion of an isolated pulse, comprising the steps of:
    (a) measuring a shape of an isolated pulse recorded on a single track of a magnetic storage medium; and
    (b) comparing the shape of the isolated pulse with a shape of an ideal isolated pulse.

16. The method of claim 15, wherein step (a) includes the step of sampling the isolated pulse.

17. The method of claims wherein step (b) includes the step of determining a least squares error between the measured shape of the isolated pulse and the shape of the ideal isolated pulse.

18. The method of claim 17, further comprising the step of determining the best fit between the measured shape of the isolated pulse and the shape of the ideal isolated pulse.

19. A system for computing a distortion of an isolated pulse included in a readback signal, the isolated pulse corresponding to a single transition included in a write data signal, the write data signal being recorded as magnetic data stored on a magnetic disk, the system comprising:
    (a) a magnetic recording head that records the write data signal on the magnetic disk and reads the readback signal, the readback signal corresponding to the magnetic data stored on the magnetic disk;
    (b) a spin stand coupled to the magnetic recording head, the spin stand spinning the magnetic disk and controlling the recording of the write data signal on the magnetic disk and the reading of the readback signal from the magnetic disk;

(c) a signal analyzer coupled to the spin stand to receive the readback signal, the signal analyzer measuring a shape of the isolated pulse; and (d) a computer coupled to the signal analyzer, the computer calculating a distortion value for the measured isolated pulse, the distortion value representing the difference between the shape of the measured isolated pulse and a shape of an ideal isolated pulse, and corresponding to the distortion of the isolated pulse.

20. The system of claim 19 wherein the signal analyzer is a digital storage oscilloscope.

21. The system of claim 19 wherein the signal analyzer is a time interval analyzer.

22. A system for computing a distortion of an isolated pulse included in a readback signal read by a magnetic recording head, the readback signal corresponding to a write data signal recorded by the magnetic recording head, the isolated pulse corresponding to a single transition included in the write data signal, the system comprising:

(a) a magnetic disk that stores magnetic data, the magnetic data being generated from the recording of the write data signal;

(b) a spin stand coupled to the magnetic recording head, the spin stand spinning the magnetic disk and controlling the recording of the write data signal on the magnetic disk and the reading of the readback signal from the magnetic disk;

(c) a signal analyzer coupled to the spin stand to receive the readback signal, the signal analyzer measuring a shape of the isolated pulse; and (d) a computer coupled to the signal analyzer, the computer calculating a distortion value for the measured isolated pulse, the distortion value representing the difference between the shape of the measured isolated pulse and a shape of an ideal isolated pulse, and corresponding to the distortion of the isolated pulse.

23. The system of claim 22 wherein the signal analyzer is a time interval analyzer.

24. The system of claim 22 wherein the signal analyzer is a digital storage oscilloscope.

* * * * *